(12) United States Patent
Furui

(10) Patent No.: US 6,698,791 B1
(45) Date of Patent: Mar. 2, 2004

(54) AIR BAG START DEVICE

(75) Inventor: Takashi Furui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/148,833

(22) PCT Filed: Oct. 11, 2000

(86) PCT No.: PCT/JP00/07051

§ 371 (c)(1), (2), (4) Date: Jun. 5, 2002

(87) PCT Pub. No.: WO02/30719

PCT Pub. Date: Apr. 18, 2002

(51) Int. Cl.[7] .............................................. B60R 21/32
(52) U.S. Cl. ...................................... 280/735; 280/741
(58) Field of Search ................................ 280/735, 741, 280/734

(56) References Cited

U.S. PATENT DOCUMENTS

| | | | | |
|---|---|---|---|---|
| 5,389,822 A | * | 2/1995 | Hora et al. | 307/10.1 |
| 5,621,326 A | * | 4/1997 | Watanabe et al. | 324/502 |
| 5,657,831 A | * | 8/1997 | Furui | 180/282 |
| 5,805,058 A | * | 9/1998 | Saito et al. | 340/436 |
| 5,903,062 A | * | 5/1999 | Mattes et al. | 307/10.1 |
| 5,977,653 A | * | 11/1999 | Schmid et al. | 307/10.1 |
| 6,036,224 A | * | 3/2000 | Wachter et al. | 280/735 |
| 6,113,138 A | * | 9/2000 | Hermann et al. | 280/735 |
| 6,256,563 B1 | * | 7/2001 | Blank et al. | 701/45 |
| 6,305,709 B1 | * | 10/2001 | Okada | 280/735 |
| 6,336,658 B1 | * | 1/2002 | Itoigawa et al. | 280/735 |
| 6,513,832 B1 | * | 2/2003 | Mader et al. | 280/735 |
| 6,595,544 B1 | * | 7/2003 | Hermann | 280/735 |

FOREIGN PATENT DOCUMENTS

| | | |
|---|---|---|
| JP | 9-211023 | 8/1997 |
| JP | 11-263188 | 9/1999 |
| JP | 11-342826 | 12/1999 |
| JP | 2000-127889 | 5/2000 |

* cited by examiner

Primary Examiner—Christopher P. Ellis
Assistant Examiner—Rashmi Sharma
(74) Attorney, Agent, or Firm—Sughrue Mion, PLLC (57) ABSTRACT

A two-stage ignition type air bag actuator having first-stage inflators and second-stage inflators, comprising power supply 11 for supplying power to the igniting devices for the inflators, a mechanical acceleration switch 12 disposed between the common junction of the respective igniting devices 4, 5, 7, and 8 and the power supply 11, and a forcible igniting mechanism 15 disposed in parallel with the mechanical acceleration switch 12 for electrically connecting or disconnecting the common junction and the power supply 11.

3 Claims, 5 Drawing Sheets

AIR BAG START DEVICE

TECHNICAL FIELD

This invention relates to an air bag actuator, and particularly to a two-stage ignition type air bag actuator which has two inflators, and ignites them in a predetermined sequence and at a predetermined time interval depending on a collision event.

BACKGROUND ART

Figure 1:
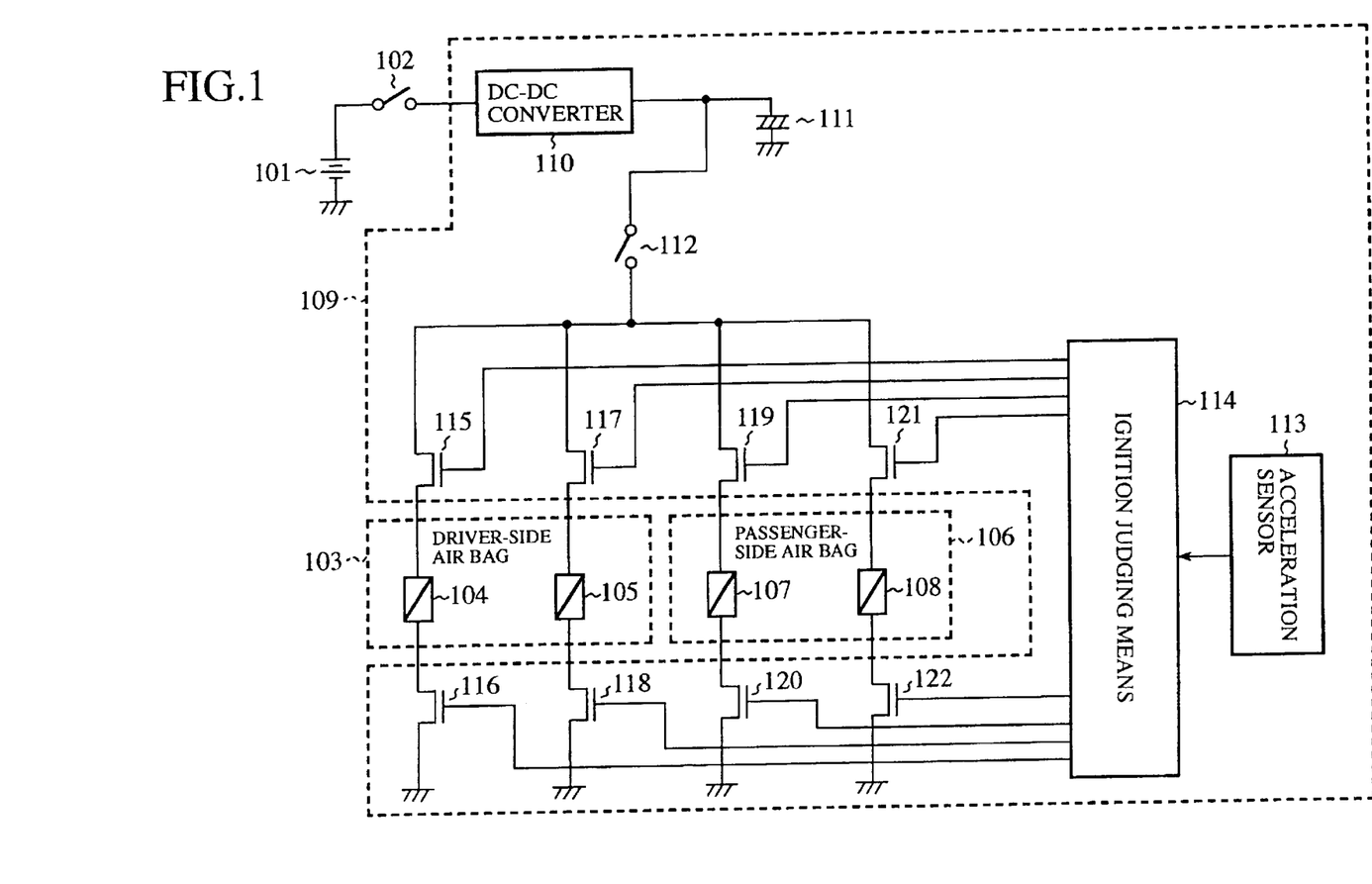
FIG. 1 is a diagram showing the configuration of the conventional air bag system.

FIG. 1 is a diagram showing the configuration of the conventional air bag system.

Referring to FIG. 1, a reference numeral 101 denotes a mobile battery, 102 an ignition switch, 103 a driver-side air bag, 104 an igniting device for the first-stage inflators of the driver-side air bag, 105 an igniting device for the second-stage inflators of the driver-side air bag, 106 a passenger-side air bag, 107 an igniting device for the first-stage inflators of the passenger-side air bag, 108 an igniting device for the second-stage inflators of the passenger-side air bag, 109 an air bag control unit, 110 a DC-DC converter, 111 a backup capacitor, 112 a mechanical acceleration switch, 113 an acceleration sensor, 114 an ignition judging means, 115 and 116 driving transistors for the first-stage inflators of the driver-side air bag 103, 117 and 118 driving transistors for the second-stage inflators of the driver-side air bag 103, 119 and 120 driving transistors for the first-stage inflators of the passenger-side air bag 106, and 121 and 122 driving transistors for the second-stage inflators of the passenger-side air bag 106.

Now, the operation of the air bag system shown in FIG. 1 will be described.

When the ignition switch 102 is closed, the DC power outputted from the mobile battery 101 is boosted in the DC-DC converter 110 to charge the backup capacitor 111.

If a collision occurs, the mechanical acceleration switch 112 closes while a large negative acceleration caused by the collision is acting. Further, the ignition judging means 114 receives an acceleration signal outputted from the acceleration sensor 113, and if it judges that a collision has occurred, it turns ON the driving transistors 115, 116, 119, and 120 to ignite the first-stage inflators of the driver-side air bag 103 and the passenger-side air bag 106. This allows a current necessary for ignition to pass through the igniting device 104 and the igniting device 107 to respectively ignite the first-stage inflators of the driver-side air bag 103 and the passenger-side air bag 106, and the driver-side air bag 103 and the passenger-side air bag 106, beginning to inflate them to an appropriate size. After the first-stage inflators are ignited, if a predetermined condition is fulfilled, the ignition judging means 114 turns ON the driving transistors 117, 118, 121, and 122 to further ignite the second-stage inflators of the driver-side air bag 103 and the passenger-side air bag 106. This allows a current necessary for ignition to pass through the igniting device 105 and the igniting device 108 to respectively ignite the second-stage inflators of the driver-side air bag 103 and the passenger-side air bag 106, and the driver-side air bag 103 and the passenger-side air bag 106, inflating them to the maximum.

The above two-stage ignition type air bag system is described, for instance, in JP 11-263188 A and determination as to whether or not the second-stage inflators should be ignited after the first-stage inflators are ignited, for instance, through comparison with variable characteristic data of various negative accelerations obtained by experiments or computer simulations.

Further, the mechanical acceleration switch 112 is provided to prevent a current from passing through inflators even if driving transistors malfunctioned, and to inhibit the ignition of the inflators due to the malfunction. Such mechanical acceleration switch is described, for instance, in JP 09-211023 A and the mechanical acceleration switch described in this publication has a structure in which a weight is moved by the so-called collision acceleration due to a collision to close the switch, and, when the acceleration disappears, the weight returns to its predetermined position by a spring force to open the switch.

Since the conventional two-stage ignition type air bag system is configured as described above, in which the second-stage inflators are ignited, with a predetermined time delayed after the first-stage inflators are ignited, if the negative acceleration at the ignition of the second-stage inflators is lower than a predetermined one, then the mechanical acceleration switch opens, disabling the supply of an ignition current from the backup capacitor. Likewise, where it is necessary to further inflate the air bag, the second-stage inflators cannot be ignited.

Moreover, to avoid the arising of the above problems, if the mechanical switch is omitted, the fail-safe function for electrical malfunction is lost as a necessary consequence.

This invention has been made to solve the above problems, and an object thereof is to provide a air bag actuator incorporating a fail-safe function for electrical malfunction, and enabling the second-stage inflators to be forcibly ignited, regardless of whether the mechanical acceleration switch is opened or closed.

DISCLOSURE OF INVENTION

The air bag actuator of this invention comprises power supply means for supplying a current necessary for igniting the inflators; a mechanical acceleration switch, which is disposed between the common junction of a first-stage igniting device provided for every one or more first-stage inflators and a second-stage igniting device provided for one or more second-stage inflators, and opens or closes depending on the acceleration of a vehicle; one or more first switching means connected in series with the first-stage igniting device for every the first-stage igniting device; one or more second switching means connected in series with the second-stage igniting device for every the second-stage igniting device; an acceleration sensor for detecting how far the acceleration is applied to the vehicle, and for outputting a signal corresponding to the acceleration; an ignition judging means, connected to the control terminals of the first switching means and the second switching means for controlling ON-OFF of the first switching means and the second switching means in response to the signal inputted from the acceleration sensor; and a forcible ignition means, disposed between the common junction of the igniting devices and the power supply means in parallel with the mechanical acceleration switch, for electrically connecting or disconnecting the common junction of the ignition means and the power supply means in response to the signal from the ignition judging means.

Thus, upon receipt of ignition instructions for the second-stage inflators from the ignition judging means, power can be supplied from the power supply means, regardless of whether the mechanical acceleration switch is opened or closed, so if the second-stage inflators need to be ignited, it ensures reliably ignition.

The air bag actuator of this invention comprises, in the forcible ignition means; forcible ignition switching means disposed between the common junction of the igniting devices and the power supply means in parallel with the mechanical acceleration switch; closure detecting means for detecting the mechanical acceleration switch is opened or closed, and for, upon the closing of the mechanical acceleration switch, holding a signal output indicative of the closure independently of the open/close state after that; and logical means, having its input portions connected to the ignition judging means and the closure detecting means and having its output portion connected to the forcible ignition switching means, for turning ON the forcible ignition switching means only when a signal instructing the ignition of the second-stage inflators is outputted from the ignition means, and a signal indicating the closure of the mechanical acceleration switch is outputted from the closure detecting means.

Thus, only if the closure of the mechanical acceleration switch is indicated and the ignition of the second-stage inflators is instructed, the forcible ignition switching means is turned ON and the current from the power supply means is supplied to ignite the second-stage inflators, so the closure of the mechanical acceleration switch must be verified to forcibly ignite the second-stage inflators, thereby preventing false ignition of the inflator due to malfunction of the ignition judging means, and upgrading the safety of the air bag system.

The air bag actuator of this invention includes a one-way conducting element, disposed at the common junction of the first-stage igniting device provided for every one or more first-stage inflators and the second-stage igniting device provided for every one or more second-stage inflators, which are connected in parallel with each other, and passing the current only in one direction, and with respect to the first junction and the second junction which are partitioned by the one-way conducting element at the common junction of the igniting devices, the current is passed only from the first junction to the second junction, and one or more first-stage devices and the mechanical acceleration switch are connected to the first junction, while one or more second-stage igniting devices and the forcible ignition means are connected to the second junction.

Thus, since no current flows into the first-stage igniting device through the forcible ignition means, even if the forcible ignition means malfunctions and the air bags inflate, the air bags inflate within the range limited to the minimum, without igniting the first-stage inflators, thereby upgrading the safety of the air bag system.

BEST MODE FOR CARRYING OUT THE INVENTION

The best mode for carrying out this invention will be described in more detail with reference to the accompanying drawings.

First Embodiment

Figure 2:
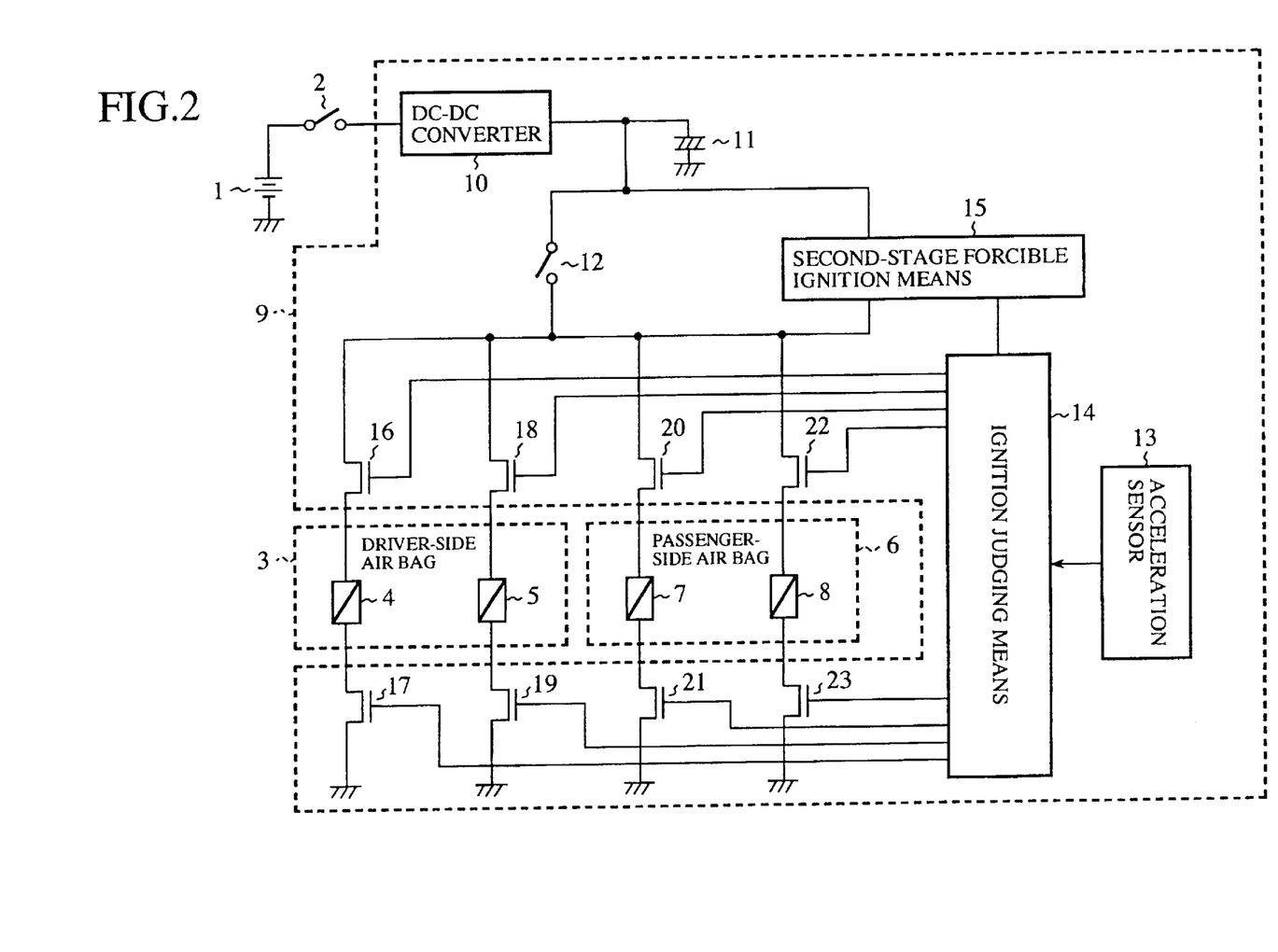
FIG. 2 is a diagram showing the configuration of an air bag system including the air bag actuator according to the first embodiment of the present invention.

FIG. 2 is a diagram showing the configuration of an air bag system including the air bag actuator according to the first embodiment of the present invention.

Referring to FIG. 2, a reference numeral 1 denotes a mobile battery, 2 an ignition switch, 3 a driver-side air bag, 4 an igniting device for the first-stage inflators for inflating the driver-side air bag 3, 5 an igniting device for the second-stage inflators which is ignited simultaneously with the first-stage inflators or with a predetermined time delayed after the first-stage inflators are ignited, as needed, 6 a passenger-side air bag, 7 an igniting device for the first-stage inflators:for inflating the passenger-side air bag 6, 8 an igniting device for the second-stage inflators which is ignited simultaneously with the first-stage inflators or with a predetermined time delayed after the first-stage inflators are ignited, as needed, 9 an air bag control unit, 10 a DC-DC converter for boosting and outputting the input voltage supplied from the mobile battery 1, 11 a backup capacitor to be charged by the output current of the DC-DC converter 10 (power supply means), 12 a mechanical acceleration switch configured so that it closes if a predetermined negative acceleration is exceeded, 13 an acceleration sensor, 14 an ignition judging means for judging the ignition of the respective first-stage inflators and second-stage inflators for the driver-side air bag 3 and the passenger-side air bag 6 based on the acceleration signal inputted from the acceleration sensor 13, 15 a second-stage forcible ignition means (forcible ignition means) disposed in parallel with the mechanical acceleration switch 12, and when forcibly igniting the second-stage inflators upon receipt of the signal from the ignition judging means 14, connecting the backup capacitor 11 and the common junction of the first-stage igniting devices 4 and 7 and the second-stage igniting devices 5 and 8, which are connected in parallel with each other, to supply an ignition current to the second-stage igniting devices 5 and 8, 16 and 17 driving transistors for controlling conducting or non-conducting of the current for igniting the first-stage inflators of the driver-side air bag 3 (first switching means), 18 and 19 driving transistors for the second-stage inflators of the driver-side air bag 3 (second switching means), 20 and 21 driving transistors for the first-stage inflators of the passenger-side air bag 6 (first switching means), and 22 and 23 driving transistors for the second-stage inflators of the passenger-side air bag 6 (second switching means). Here, the ignition judging means 14 is connected to the gates (control terminals) of the driving transistors 16, 17, 18, 19, 20, 21, 22, and 23, and configured to control ON-OFF of the driving transistors 16, 17, 18, 19, 20, 21, 22, and 23 in response to the acceleration signal inputted from the acceleration sensor 13.

Now, the operation of the air bag system shown in FIG. 2 will be described.

Figure 3:
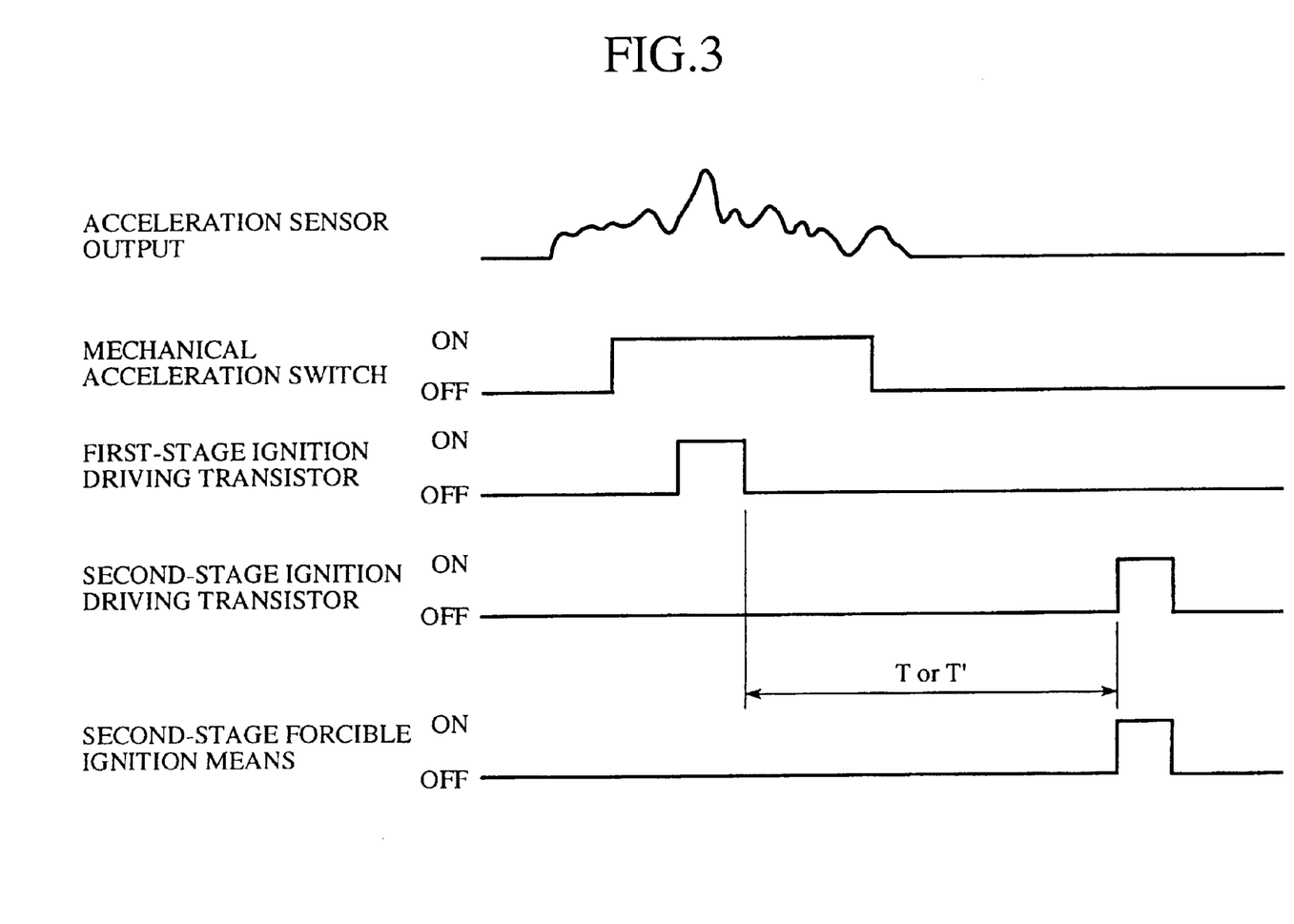
FIG. 3 is a timing chart showing the various states of the ignition operation in the air bag system according to the first embodiment of the present invention.

FIG. 3 is a timing chart showing the various states of the ignition-operation in the air bag system shown in FIG. 2.

When the key is turned to the position for starting the engine, and the ignition switch 2 is closed, the DC current outputted from the mobile battery 1 is boosted by the DC-DC converter 10 to charge the backup capacitor 11.

If a collision occurs, the mechanical acceleration switch 12 closes during the negative acceleration caused by the collision exceeds a predetermined acceleration. Further, based on the acceleration signal inputted from the acceleration sensor 13, the ignition judging means 14 selects an appropriate inflating mode from the following for the driver-side air bag 3 and passenger-side air bag 6.

Inflating mode A: Air bags are not inflated.

Inflating mode B: Only the first-stage inflators are ignited to inflate the air bags to an appropriate degree.

Inflating mode C: After the first-stage inflators are ignited, the second-stage inflators are also ignited with a predetermined time delayed to inflate the air bags largely to a certain degree.

Inflating mode D: The first-stage inflators and the second-stage inflators are simultaneously ignited to inflate the air bags largely.

If the inflating mode D is selected, the ignition judging means 14 simultaneously turns ON the driving transistors 16, 17, 18, 19, 20, 21, 22, and 23 to ignite the first-stage inflators and the second-stage inflators of the driver-side air bag 3 and the passenger-side air bag 6. This allows a current necessary for ignition to pass through the first-stage igniting devices 4 and 7 and the second-stage igniting devices 5 and 8, ignites the first-stage inflators and the second-stage inflators, and inflates largely the driver-side air bag 3 and the passenger-side air bag 6.

If the inflating mode B or the inflating mode C is selected, the ignition judging means 14 turns ON the driving transistors 16, 17, 20, and 21 to ignite the first-stage inflators for the driver-side air bag 3 and the passenger-side air bag 6. This allows a current necessary for ignition to pass through the first-stage igniting devices 4 and 7, ignites the first-stage inflators, and inflates the driver-side air bag 3 and the passenger-side air bag 6 to an appropriate degree. In this case, as shown in FIG. 3, the mechanical acceleration switch 12 is closed when the driving transistors for igniting the first-stage inflators are turned ON, thereby ensuring reliable ignition of the first-stage inflators.

The inflating mode B is selected, since it is not preferred to leave the second-stage inflators unignited for safety's sake, the ignition judging means 14 forcibly ignite the second-stage inflators at the end of the collision. In this case, the delay time from the ignition of the first-stage inflators to that of the second-stage inflators is, for instance, T=100 milliseconds. As shown in FIG. 3, since it is conceivable that the mechanical acceleration switch 12 is open when the second-stage inflators are ignited, the ignition judging means 14 turns ON the driving transistors 18, 19, 22, and 23 to ignite the second-stage inflators, and drives the second-stage forcible ignition means 15 to connect the backup capacitor 11 to the common junction of the first-stage igniting devices 4 and 7 and the second-stage igniting devices 5 and 8, which are connected in parallel with each other, thereby supplying a current to the second-stage igniting devices 5 and 8 to ignite the second-stage inflators.

If the inflating mode C is selected, the ignition judging means 14 forcibly ignites the second-stage inflators after an elapse of a predetermined delay time. In this case, the delay time from the ignition of the first-stage inflators to that of the second-stage inflators may be, for instance, T'=several milliseconds. Similarly, it is conceivable that the mechanical acceleration switch 12 is open when the second-stage inflators are ignited, so the ignition judging means 14 turns ON the driving transistors 18, 19, 22, and 23, and drives the second-stage forcible ignition means 15. This allows a current necessary for ignition to pass through the second-stage igniting devices 5 and 8, ignites the second-stage inflators, and inflates the driver-side air bag 3 and the passenger-side air bag 6 largely to a certain degree.

As described above, according to the first embodiment, it is configured to have the second-stage forcible ignition means 15, which is disposed in parallel with the mechanical acceleration switch 12, and in response to the signal from the ignition judging means 14 electrically connect or disconnect the common junction of the first-stage igniting devices 4 and 7 and the second-stage igniting devices 5 and 8, which are connected in parallel with each other, to or from the backup capacitor 11. Therefore, upon receipt of ignition instructions for the second-stage inflators from the ignition judging means 14, a current can be supplied from the backup capacitor 11, regardless of whether the mechanical acceleration switch 12 is opened or closed, thereby ensuring reliable ignition of the second-stage inflators, if necessary.

Second Embodiment

Figure 4:
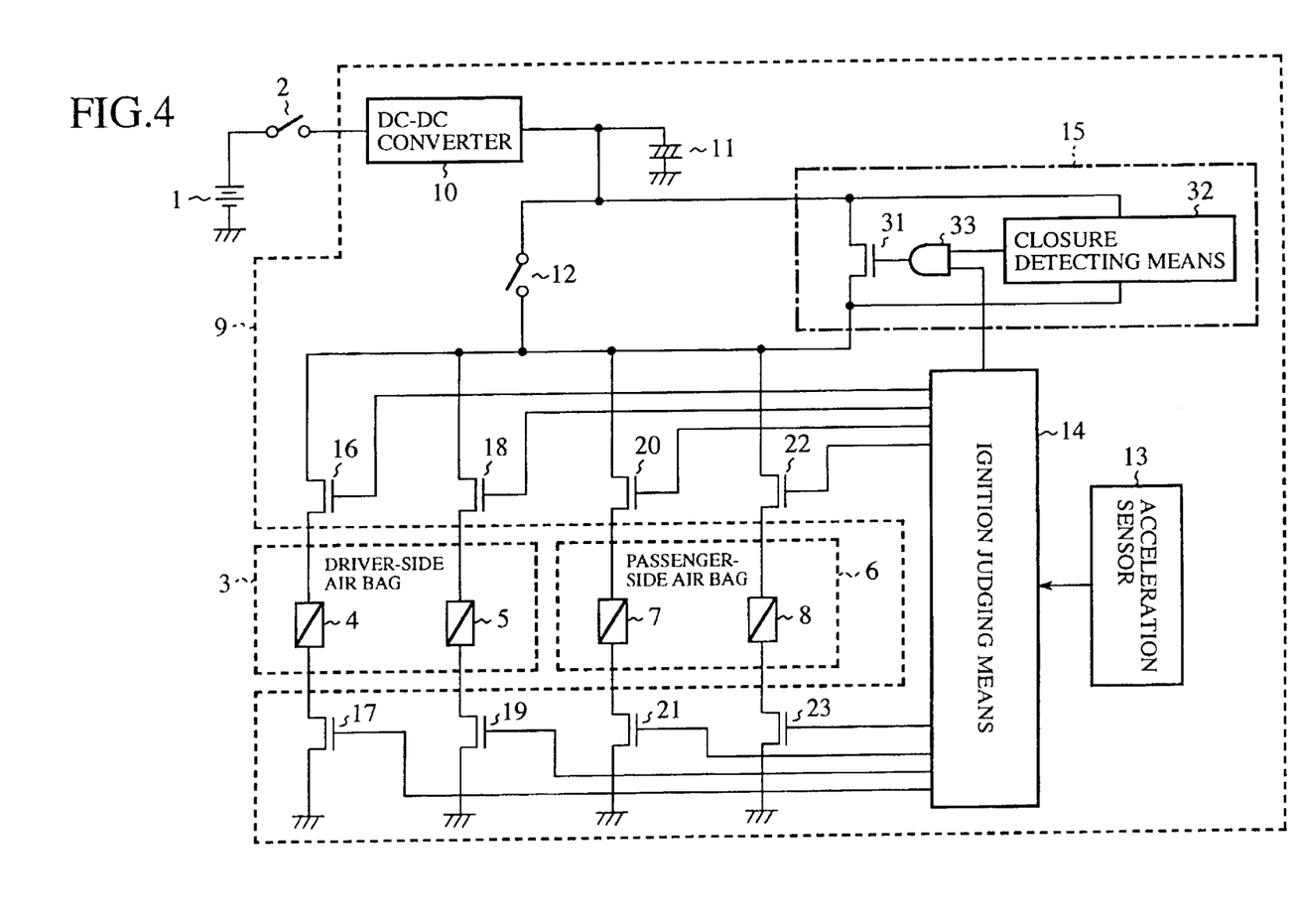
FIG. 4 is a diagram showing the configuration of an air bag system including the air bag actuator according to the second embodiment of the present invention.

FIG. 4 is a diagram showing an air bag system including the air bag actuator according to the second embodiment of the present invention.

Referring to FIG. 4, the same reference numerals as those in FIG. 2 indicate the same or identical portions, so the description thereof is omitted. A reference numeral 31 denotes a driving transistor (forcible ignition switching means) disposed in parallel with the mechanical acceleration switch 12 between the common junction of the first-stage igniting devices 4 and 7 and the second-stage igniting devices 5 and 8, which are connected in parallel with each other, and the backup capacitor 11, 32 a closure detecting means for detecting whether the mechanical acceleration switch 12 is opened or closed, and for holding a signal output indicative of the closure for a predetermined time after the mechanical acceleration switch 12 has opened after the closure, and 33a two-input AND gate (logical means) having its two input terminals respectively connected to the ignition judging means 14 and the closure detecting means 32, and having its output connected to the gate (control terminal) of the driving transistor. With this arrangement, only if a "H" level signal instructing the ignition of the second-stage inflators is outputted from the ignition judging means 14, and a "H" level signal indicative of the closure of the mechanical acceleration switch 12 is outputted from the closure detecting means 32, the driving transistor 31 is turned ON and gets into conductive state. The second-stage forcible ignition means 15 shown in the first embodiment is formed of the driving transistor 31, of the closure detecting means 32, and of the AND gate 33.

Now, the operation of the air bag system shown in FIG. 4 will be described. However, the operation of the charging of the backup capacity 11, of the selection of an air bag inflating mode, and of the ignition of the first-stage inflators is the same as that of the first embodiment, so that the description thereof is omitted for brevity.

If a collision occurs, the mechanical acceleration switch 12 closes when the negative acceleration caused by the collision exceeds a predetermined one. In this event, the closure detecting means 32 detects that the mechanical acceleration switch 12 is closed, and changes the output signal to the AND gate 33 from a "L" level to a "H" level and holds this signal level.

If the inflating mode B or the inflating mode C described in the first embodiment is selected, the ignition judging means 14 ignites the second-stage inflators after a predetermined time is elapsed since the first-stage inflators are ignited. At this point of time, it is conceivable that the mechanical acceleration switch 12 is open, as described in the first embodiment, so the ignition judging means 14 turns ON the driving transistors 18, 19, 22, and 23 to ignite the second-stage inflators for the driver-side air bag 3 and the passenger-side air bag 6, and changes the output signal to the AND gate 33 from the "L" level to the "H" level.

Since the "H" level signals are inputted to both of the two input terminals of the AND gate 33, the AND gate 33 turns ON the driving transistor 31 and gets into conductive state. This allows the common junction of the first-stage igniting devices 4 and 7 and the second-stage igniting devices 5 and 8, which are connected in parallel with each other, and the backup capacitor 11 to be electrically connected, so that a current from the backup capacitor 11 to the second-stage igniting devices 5 and 8 is supplied to ignite the second-stage inflators.

As described above, according to the second embodiment, since there are provided the driving transistor 31 connected in parallel with the mechanical acceleration switch 12, the closure detecting means 32 for detecting whether the mechanical acceleration switch 12 is opened or closed, and for holding a signal output indicative of the closure of the mechanical acceleration switch 12 for a predetermined time after it has opened after the closure, and the AND gate 33 having its two input terminals respectively connected to the ignition judging means 14 and the closure detecting means 32, and having its output terminal connected to the gate of the driving transistor 31, the drive transistor 31 is turned ON and supplies the current from the backup capacitor 11 to ignite the second-stage inflators. Only if the "H" level signal instructing the ignition of the second-stage inflators is outputted from the ignition judging means 14, and the "H" level signal indicative of the closure of the mechanical acceleration switch 12 is outputted from the closure detecting means 32, the driving transistor 31 turns ON and a current is supplied from the back up capacitor 11 to ignite the second-stage inflators. Accordingly, the verification of the closure of the mechanical acceleration switch 12 is added as the ignition condition for the forcible ignition of the second-stage inflators, thereby preventing false ignition of inflators- due to malfunction of the ignition judging means 14, and upgrading the safety of the air bag system.

Third Embodiment

Figure 5:
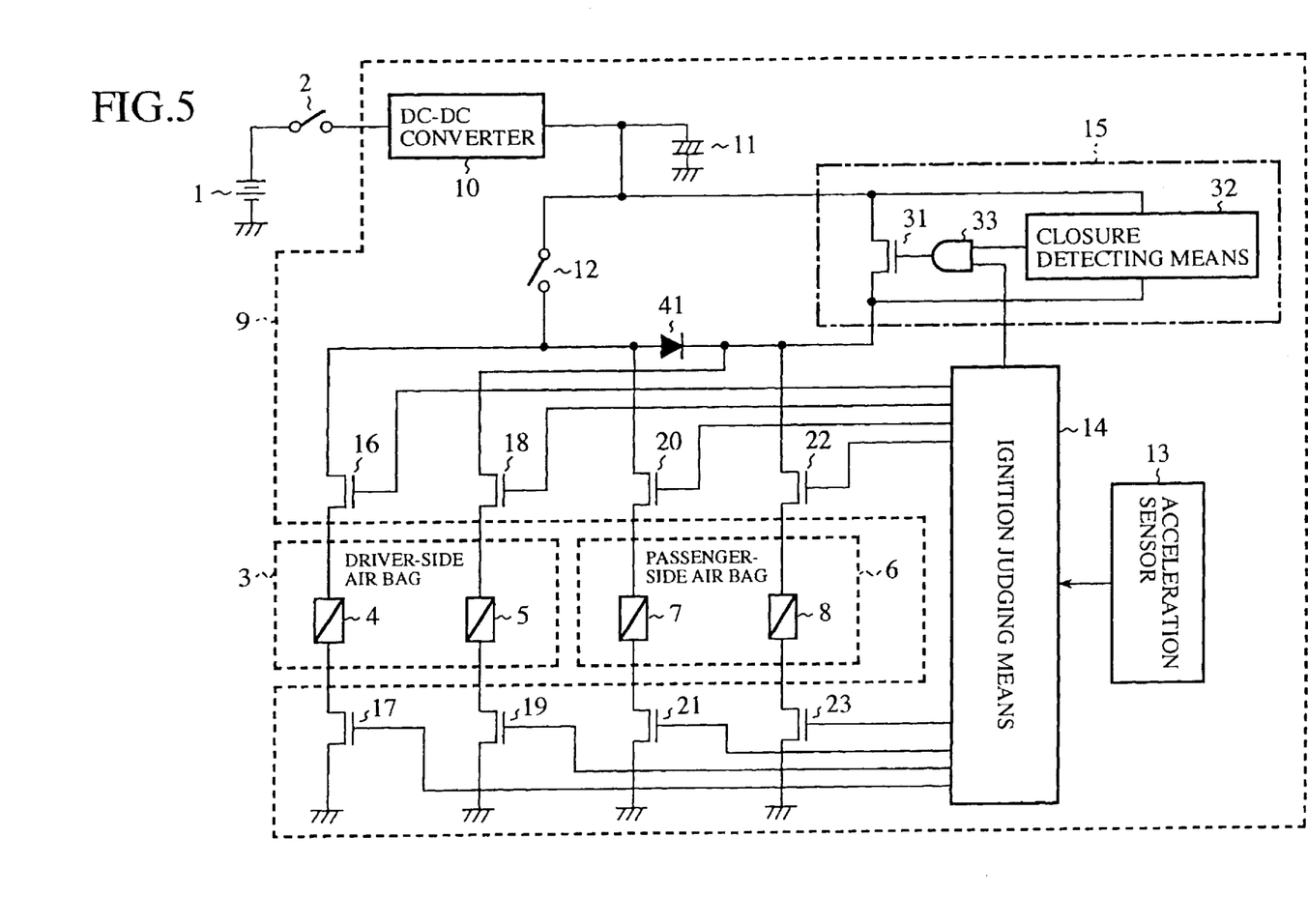
FIG. 5 is a diagram showing the air bag system including the air bag actuator according to the third embodiment of the present invention.

FIG. 5 is a diagram showing the configuration of an air bag system including the air bag actuator according to the third embodiment of the present invention.

Referring to FIG. 5, the same reference numeral as those in FIG. 4 indicate the same or identical portions, so the description thereof is omitted. A reference numeral 41 denotes a diode (one-way conducting element) disposed at the common junction of the first-stage igniting devices 4 and 7 and the second-stage igniting devices 5 and 8, which are connected in parallel with each other, for passing a current only in one direction. Further, the common junction is partitioned by the diode 41 into a first junction and a second junction to allow a current to pass only from the first junction to the second junction, and the first-stage igniting device 4 of the driver-side air bag 3, the first-stage igniting device 7 of the passenger-side air bag 6, and the mechanical acceleration switch 12 are connected to the first junction, while the second-stage igniting device 5 of the driver-side air bag 3, the second-stage igniting device 8 of the passenger-side air bag 6, and the second-stage forcible ignition means 15 are connected to the second junction.

Now, the operation of the air bag system shown in FIG. 5 will be described. The operation of the ignition of the first-stage and second-stage inflators, and the like, is the same as that of the first embodiment, so the description thereof is omitted for brevity.

With the above arrangement, the current passing through the second-stage forcible ignition means 15 is disallowed to pass through the first-stage igniting devices 4 and 7. Accordingly, even if the second-stage forcible ignition means 15 malfunctions, no ignition current passes through the first-stage inflators, and even if the second-stage inflators are ignited, the air bags inflate just a little.

As described above, according to the third embodiment, there is provided the diode 41 disposed at the common junction of the first-stage igniting devices 4 and 7 and the second-stage igniting devices 5 and 8, which are connected in parallel with each other, passing a current only in one direction, thereby preventing the current passing through the second-stage forcible ignition means 15 from flowing into the first-stage igniting devices 4 and 7. Accordingly, even if the second-stage ignition means 15 malfunctions and inflates the air bag, the air bags inflate within the range limited to the minimum, thereby upgrading the safety of the air bag system.

In the above first to third embodiments, the ignition judging means 14, the closure detecting means 32, the AND gate 33 as a logical means, and the like can be implemented by software, and above each means can be replaced by a microcomputer incorporating a program in which the operations of the particular means are described.

Industrial Applicability

As described above, the air bag actuator of this invention is qualified for ensuring reliable ignition of the inflators of the two-stage ignition type air bag.

What is claimed is:

1. In an air bag actuator for inflating at least one two-stage ignition type air bag, having first-stage inflators, and second inflators which are ignited simultaneously with said first-stage inflators or after a predetermined time has elapsed since said first-stage inflators are ignited, comprising:

power supply means for supplying a current necessary for igniting said inflators;

a mechanical acceleration switch, which is disposed between the common junction of a first-stage igniting device provided for every one or more first-stage inflators and a second-stage igniting device provided for one or more second-stage inflators, and opens or closes depending on the acceleration of a vehicle;

one or more first switching means connected in series with said first-stage igniting device for every said first-stage igniting device;

one or more second switching means connected in series with said second-stage igniting device for every said second-stage igniting device;

an acceleration sensor for detecting how far the acceleration is applied to the vehicle, and for outputting a signal corresponding to the acceleration;

an ignition judging means, connected to the control terminals of said first switching means and said second switching means, for controlling ON-OFF of said first switching means and said second switching means in response to the signal inputted from said acceleration sensor; and forcible igniting means, disposed between said common junction of the igniting devices and said power supply means in parallel with said mechanical acceleration switch, for electrically connecting or disconnecting said common junction and said power supply means in response to the signal from said ignition judging means.

2. The air bag actuator according to claim 1, wherein said forcible igniting means comprises:

forcible ignition switching means disposed between the common junction of the igniting devices and the power supply means in parallel with the mechanical acceleration switch;

closure detecting means for detecting said mechanical acceleration switch is opened or closed, and for holding a signal output indicative of the closure of said mechanical acceleration switch for a predetermined time after it has opened after the closure; and logical means, having its input portions connected to the ignition judging means and said closure detecting means and having its output portion connected to said forcible ignition switching means, for turning ON said forcible ignition switching means only when a signal instructing the ignition of the second-stage inflators is outputted from said ignition judging means, and a signal indicative of the closure of said mechanical acceleration switch is outputted from said closure detecting means.

3. The air bag actuator according to claim 1, wherein a one-way conducting element, disposed at the common junction of the first-stage igniting device provided for every one ore more first-stage inflators, and the second-stage igniting device provided for every one or more second-stage inflators, for passing a current only in one direction, and wherein, with respect to a first junction and a second junction which are partitioned by the one-way conducting element at said common junction of the igniting devices, a current is passed only from said first junction to said second junction, and one or more said first-stage igniting devices and said mechanical acceleration switch are connected to said first junction, while one or more said second igniting devices and said forcible igniting means are connected to said second junction.

* * * * *